United States Patent
Shimozawa (10) Patent No.: US 12,530,653 B2
(45) Date of Patent: Jan. 20, 2026

(54) APPARATUS, METHOD, AND SYSTEM FOR GENERATING TRANSPORT VEHICLE DRIVING PLANS

(71) Applicant: ISUZU MOTORS LIMITED, Yokohama (JP)

(72) Inventor: Tomoaki Shimozawa, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 121 days.

(21) Appl. No.: 18/411,433

(22) Filed: Jan. 12, 2024

(65) Prior Publication Data
US 2024/0289736 A1  Aug. 29, 2024

(30) Foreign Application Priority Data
Feb. 27, 2023 (JP) ................................ 2023-028093

(51) Int. Cl.
*G06Q 10/0835* (2023.01)
*G06Q 30/018* (2023.01)

(52) U.S. Cl.
CPC ..... *G06Q 10/08355* (2013.01); *G06Q 30/018* (2013.01)

(58) Field of Classification Search
CPC .. G06Q 30/018; G06Q 10/04; G06Q 30/0202; G06Q 40/04; G06Q 10/08
See application file for complete search history.

(56) References Cited

U.S. PATENT DOCUMENTS 10,402,771 B1 * 9/2019 De ........................... G08G 1/20
12,333,457 B1 * 6/2025 Monyei .............. G06Q 30/0202
(Continued)

FOREIGN PATENT DOCUMENTS

| JP | 2012-083882 A | 4/2012 | |
|---|---|---|---|
| JP | 7609039 B2 * | 1/2025 | |
| WO | WO-2023187925 A1 * | 10/2023 | ........... G06Q 10/083 |

OTHER PUBLICATIONS

Gaoyuan Qin et al; "A Vehicle Routing Optimization Problem for Cold Chain Logistics Considering Customer Satisfaction and Carbon Emissions"; Feb. 1, 2019; PubMed Central; https://pmc.ncbi.nlm.nih.gov/articles/PMC6406631/ (Year: 2019).*

*Primary Examiner* — Shannon S Campbell
*Assistant Examiner* — David G. Godbold
(74) *Attorney, Agent, or Firm* — PROCOPIO, CORY, HARGREAVES & SAVITCH LLP (57) ABSTRACT

An information processing apparatus has: an accepting section that accepts a carbon-dioxide emission-amount reduction request related to the delivery of delivery goods; a calculating section that calculates a charge-amount reduction amount of an electric power storage apparatus in a case where a transport vehicle drives in at least a part of a target delivery area of the consignor of the delivery goods by using a motor such that a carbon-dioxide emission-amount reduction amount corresponding to the reduction request is satisfied; and a generating section that sets a use amount of the motor in a delivery area before the target delivery area such that the charge amount of the electric power storage apparatus at the start of the target delivery area exceeds the reduction amount, and generates driving plan information for the transport vehicle in each delivery area.

15 Claims, 5 Drawing Sheets

(56) References Cited

U.S. PATENT DOCUMENTS

| | | | |
|---|---|---|---|
| 2009/0210313 A1* | 8/2009 | Winebrake | G06Q 30/0601 |
| | | | 705/26.1 |
| 2019/0322267 A1* | 10/2019 | Kurihashi | B60W 10/06 |
| 2023/0298047 A1* | 9/2023 | Nakashima | G06Q 30/018 |
| | | | 705/317 |
| 2024/0278679 A1* | 8/2024 | Song | B60L 53/80 |

* cited by examiner

| VEHICLE ID | DELIVERY DATE | DELIVERY SEQUENCE | CONSIGN-OR ID | DELIVERY START POSITION | DELIVERY END POSITION |
|---|---|---|---|---|---|
| V0001 | 2023/2/8 | 1 | C0001 | (X1,Y1) | (X2,Y2) |
| | | 2 | C0002 | (X2,Y2) | (X3,Y3) |
| | | 3 | C0003 | (X3,Y3) | (X4,Y4) |
| V0002 | 2023/2/8 | 1 | C0004 | (X5,Y5) | (X6,Y6) |
| | | ... | ... | ... | ... |
| ... | ... | ... | ... | ... | ... |

FIG. 3

| VEHICLE ID | DELIVERY SEQUENCE | DELIVERY START POSITION | DELIVERY END POSITION | DRIVING STATE |
|---|---|---|---|---|
| 2023/2/8 | 1 | (X1,Y1) | (X2,Y2) | MOTOR-ASSIST ENABLED |
| | 2 | (X2,Y2) | (X3,Y3) | ONLY MOTOR |
| | 3 | (X3,Y3) | (X4,Y4) | MOTOR-ASSIST DISABLED |

APPARATUS, METHOD, AND SYSTEM FOR GENERATING TRANSPORT VEHICLE DRIVING PLANS

CROSS-REFERENCE TO RELATED APPLICATIONS

The present application claims priority to Japanese Patent Application number 2023-028093, filed on Feb. 27, 2023, contents of which are incorporated herein by reference in its entirety.

BACKGROUND OF THE INVENTION

The present invention relates to an information processing apparatus, an information processing method, and a driving control system.

Conventionally, efforts have been made to reduce carbon dioxide emission amounts related to the delivery of delivery goods. For example, Japanese Patent Application Publication No. 2012-083882 discloses an apparatus that reduces a carbon dioxide emission amount by creating a delivery plan for performing the delivery of a plurality of delivery goods quantitively effectively, and delivering the delivery goods on the basis of the created delivery plan.

In a case of a hybrid car, carbon dioxide emission at the time of driving can be reduced by prioritizing driving by using a motor that operates with electric power supplied from a battery (electric power storage apparatus) over driving by using an engine.

In a situation of the delivery of delivery goods, delivery goods of a plurality of consignors are delivered. A manager draws up a driving plan for delivering a plurality of the delivery goods that the plurality of consignors requested to deliver. In addition, some consignors wish to reduce emission amounts of carbon dioxide that is emitted when delivery goods that they request to deliver are delivered, in some cases.

Problems to be Solved by the Invention

However, if, in the delivery of delivery goods of a plurality of consignors by a hybrid car, driving with electric power supplied from an electric power storage apparatus is prioritized while delivery goods of a certain consignor are delivered, the remaining amount of the electric power storage apparatus becomes insufficient in driving in areas corresponding to remaining consignors, in some cases. As a result, a problem that carbon dioxide emission amounts in the delivery of delivery goods of the remaining consignors cannot be reduced occurs.

BRIEF SUMMARY OF THE INVENTION

Therefore, the present invention has been made in view of these matters, and an object thereof is to make it possible to meet carbon-dioxide emission-amount reduction requests related to the delivery of delivery goods from consignors.

Means for Solving the Problems

An information processing apparatus according to a first aspect of the present invention is an information processing apparatus that generates a driving plan for a transport vehicle that is driven by using an engine and a motor that is driven with electric power from an electric power storage apparatus, the information processing apparatus having: a storage section that stores delivery area information representing a delivery area of one or more delivery goods requested by each of a plurality of consignors: an accepting section that accepts a carbon-dioxide emission-amount reduction request related to delivery of one or more delivery goods requested by a particular consignor in the plurality of consignors: a calculating section that calculates a charge-amount reduction amount of the electric power storage apparatus in a case where the transport vehicle drives by using the motor such that a carbon-dioxide emission-amount reduction amount corresponding to the reduction request is satisfied in a target delivery area which is a delivery area of the particular consignor on a basis of the delivery area information: a generating section that sets a use amount of the motor in a delivery area before the target delivery area such that the charge amount of the electric power storage apparatus at a start of the target delivery area exceeds the reduction amount calculated by the calculating section, and generates driving plan information for the transport vehicle in each delivery area; and a transmitting section that transmits the driving plan information generated by the generating section to the transport vehicle.

A computer-executed information processing method according to a second aspect of the present invention has: a step of accepting a carbon-dioxide emission-amount reduction request related to delivery of one or more delivery goods requested by a particular consignor in a plurality of consignors who request delivery of each of a plurality of delivery goods to be delivered by a transport vehicle that is driven by using an engine and a motor that is driven with electric power from an electric power storage apparatus: a step of referring to a storage section that stores delivery area information representing a delivery area of one or more delivery goods requested by each of the plurality of consignors, and calculating a charge-amount reduction amount of the electric power storage apparatus in a case where the transport vehicle drives by using the motor such that a carbon-dioxide emission-amount reduction amount corresponding to the reduction request is satisfied in a target delivery area which is a delivery area of the particular consignor: a step of setting a use amount of the motor in a delivery area before the target delivery area, and generating driving plan information for the transport vehicle in each delivery area such that the charge amount of the electric power storage apparatus at a start of the target delivery area exceeds the calculated reduction amount; and a step of transmitting the generated driving plan information to the transport vehicle.

A driving control system according to a third aspect of the present invention is a driving control system having: a transport vehicle that is driven by using an engine and a motor that is driven with electric power from an electric power storage apparatus; and an information processing apparatus that generates driving plan information for the transport vehicle, in which the information processing apparatus has: a storage section that stores delivery area information representing a delivery area of one or more delivery goods requested by each of a plurality of consignors: an accepting section that accepts a carbon-dioxide emission-amount reduction request related to delivery of one or more delivery goods requested by a particular consignor in the plurality of consignors: a calculating section that calculates a charge-amount reduction amount of the electric power storage apparatus in a case where the transport vehicle drives by using the motor such that a carbon-dioxide emission-amount reduction amount corresponding to the reduction request is satisfied in a target delivery area which is a delivery area of the particular consignor on a basis of the delivery area information: a generating section that sets a use amount of the motor in a delivery area before the target delivery area such that the charge amount of the electric power storage apparatus at a start of the target delivery area exceeds the reduction amount calculated by the calculating section, and generates driving plan information for the transport vehicle in each delivery area; and a transmitting section that transmits the driving plan information generated by the generating section to the transport vehicle, and the transport vehicle has: a receiving section that receives the driving plan information from the information processing apparatus; and a driving control section that controls driving of the transport vehicle by controlling the engine and the motor on a basis of the driving plan information received by the receiving section.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

[Overview of Driving Control System S]

Figure 1:
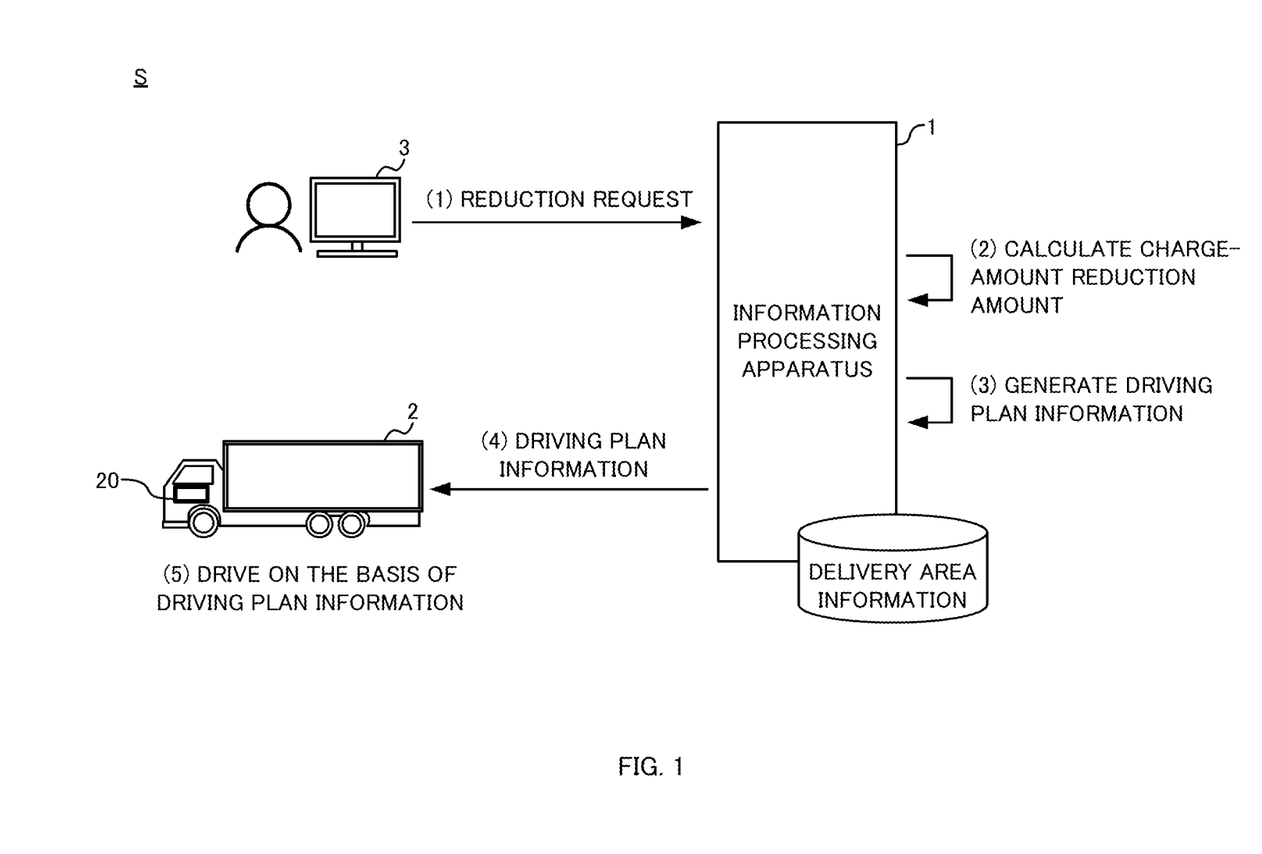
FIG. 1 is a figure depicting an overview of a driving control system.

FIG. 1 is a figure depicting an overview of a driving control system S. For example, the driving control system S is a system for reducing a carbon dioxide emission amount of a transport vehicle 2 that can drive by using an engine and a motor that is driven with electric power supplied from an electric power storage apparatus (e.g. a battery) in a delivery area of a consignor who requests reduction of a carbon dioxide emission amount in a case where the transport vehicle 2 delivers delivery goods of each of a plurality of consignors in a single course of driving.

The driving control system S has an information processing apparatus 1 and a transport vehicle 2. For example, the information processing apparatus 1 is a computer. The information processing apparatus 1 stores delivery area information corresponding to each of a plurality of consignors who requested the delivery of each of a plurality of delivery goods that the transport vehicle 2 delivers in a single course of driving. The delivery area information represents a delivery start position and a delivery end position corresponding to each of the plurality of consignors. For example, it is supposed that the single course of driving is driving of the transport vehicle 2 in one day. For example, the transport vehicle 2 is a hybrid car that can drive by using the engine and the motor that is driven with electric power from the electric power storage apparatus.

From at least some consignors of the plurality of consignors, the information processing apparatus 1 accepts carbon-dioxide emission-amount reduction requests related to the delivery of delivery goods corresponding to the consignors ((1) in FIG. 1). In response to acceptance of a reduction request, the information processing apparatus 1 identifies a target delivery area which is a delivery area of a consignor who made the reduction request in a plurality of delivery areas in the single course of driving. The information processing apparatus 1 calculates a charge-amount reduction amount of the electric power storage apparatus in a case where the transport vehicle 2 drives in at least a partial area of the target delivery area by using the motor such that a carbon-dioxide emission-amount reduction amount corresponding to the reduction request is satisfied ((2) in FIG. 1).

The information processing apparatus 1 generates driving plan information for the transport vehicle 2 on the basis of the calculated charge-amount reduction amount ((3) in FIG. 1). The information processing apparatus 1 specifies a use amount of the motor using electric power from the electric power storage apparatus of the transport vehicle 2 in a delivery area before the target delivery area such that the charge amount of the electric power storage apparatus at the start of the target delivery area exceeds the calculated charge-amount reduction amount. For example, the use amount of the motor is a period or a distance in which or which the transport vehicle 2 drives by using only the motor, or an amount, a frequency, a period, or the like of drive-force support (assistance) of the engine from the motor in a case where the transport vehicle 2 drives with the assistance. Moreover, an amount of electric power from the electric power storage apparatus that can be used in the delivery area before the target delivery area can also be defined as the usable amount of the motor. That is, the information processing apparatus 1 sets driving control in the delivery area before the target delivery area such that, before driving in the target delivery area is started, a remaining amount greater than the reduction amount of the charge amount calculated in (2) described above can be reserved in the electric power storage apparatus. The information processing apparatus 1 generates the driving plan information for the transport vehicle 2 specifying a use amount of the motor of the transport vehicle 2 in each delivery area such that the carbon-dioxide emission-amount reduction amounts corresponding to the reduction requests are satisfied.

The information processing apparatus 1 transmits the generated driving plan information to a driving control apparatus 20 provided on the transport vehicle 2 ((4) in FIG. 1). The driving control apparatus 20 of the transport vehicle 2 controls a use amount of the motor in the delivery area of each of the plurality of consignors on the basis of the driving plan information received from the information processing apparatus 1 ((5) in FIG. 1). The transport vehicle 2 drives in at least parts of the target delivery areas by using the motor on the basis of the driving plan information in a state where the electric power storage apparatus is sufficiently charged at time points when driving in the target delivery areas is started. Accordingly, the driving control system S can reduce the carbon dioxide emission amounts corresponding to the carbon-dioxide emission-amount reduction requests from the consignors.

[Configuration of Information Processing Apparatus 1]

Figure 2:
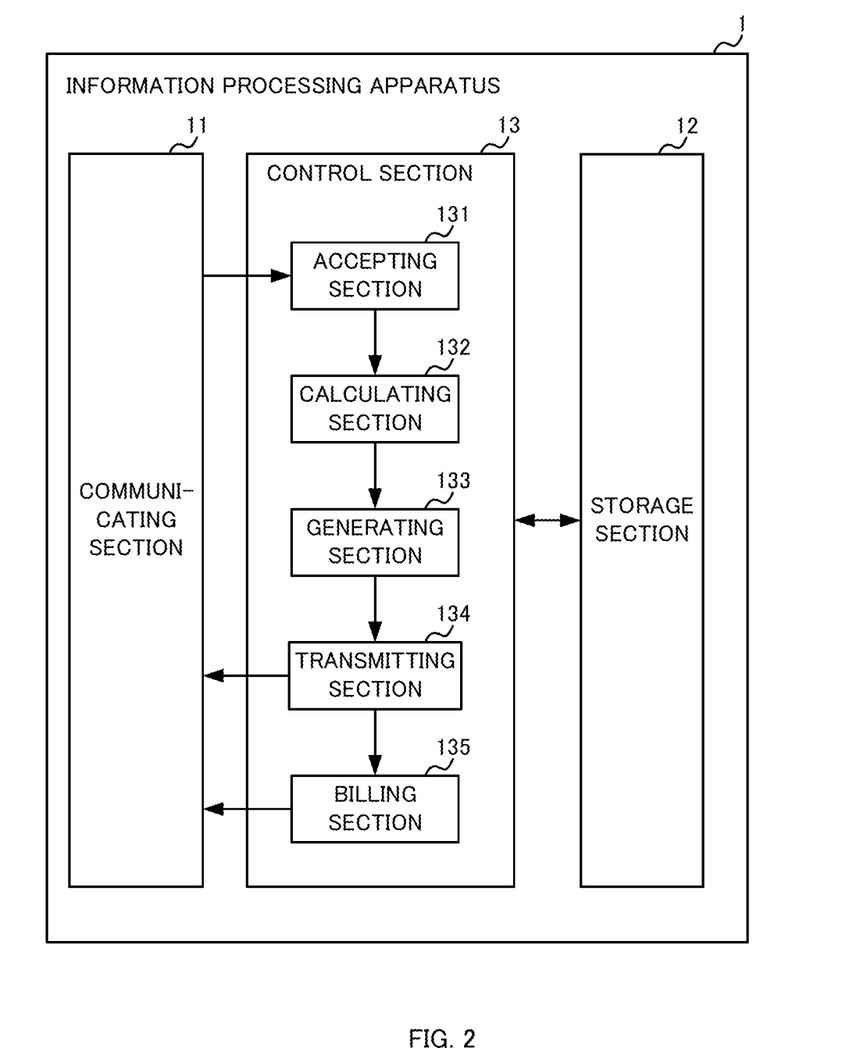
FIG. 2 is a figure depicting the functional configuration of an information processing apparatus.

Next, the configuration of the information processing apparatus 1 is explained. FIG. 2 is a figure depicting the functional configuration of the information processing apparatus 1. As depicted in FIG. 2, the information processing apparatus 1 has a communicating section 11, a storage section 12, and a control section 13.

The communicating section 11 is a communication interface for transmitting and receiving data to and from transport vehicles 2 via a wireless communication line such as an Internet line or a wireless LAN line.

For example, the storage section 12 is a RAM (Random Access Memory) or a ROM (Read Only Memory). The storage section 12 stores a program that causes the control section 13 to function as an accepting section 131, a calculating section 132, a generating section 133, a transmitting section 134, and a billing section 135.

In addition, the storage section 12 stores delivery area information corresponding to each of a plurality of consignors who requested the delivery of each of a plurality of delivery goods that a transport vehicle 2 delivers in a single course of driving. The delivery area information includes a delivery start position and a delivery end position corresponding to each of the plurality of consignors, and represents delivery areas.

Figure 3:
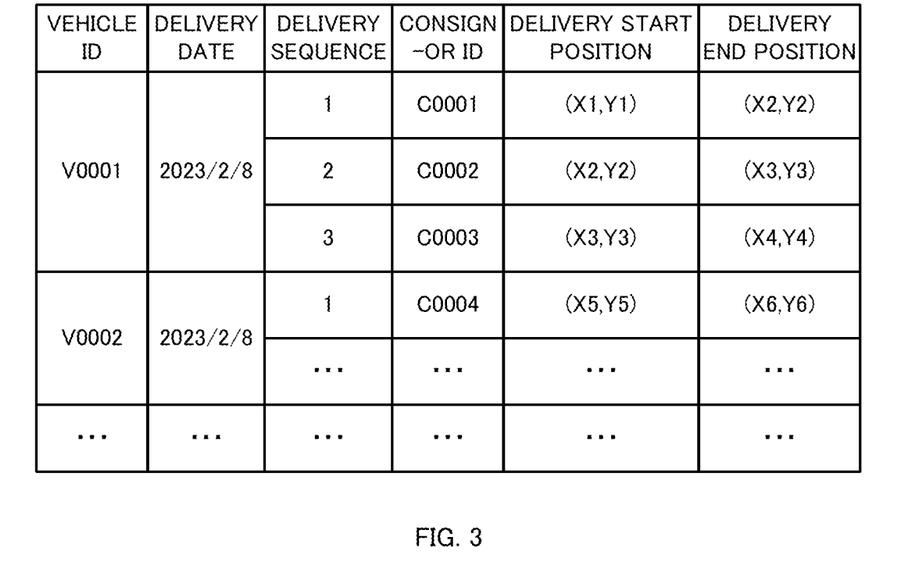
FIG. 3 is a figure depicting an example of delivery area information.

FIG. 3 is a figure depicting an example of the delivery area information. As depicted in FIG. 3, the delivery area information is information in which vehicle IDs, delivery dates of delivery goods of transport vehicles 2, positions in sequences of the delivery of the delivery goods, consignor IDs corresponding to the delivery goods, and delivery start positions and delivery end positions representing delivery areas corresponding to the delivery goods are associated with each other. Each vehicle ID is identification information for identifying a transport vehicle 2. Each consignor ID is identification information for identifying a consignor. It is supposed here that, for example, a single course of driving of a transport vehicle 2 is driving of the transport vehicle 2 in one day. FIG. 3 depicts an example of the delivery of delivery goods of each of consignor IDs "A," "B," and "C" by a transport vehicle 2 with a vehicle ID "V0001" in driving on Feb. 8, 2023, that is, in a single course of driving.

Note that, for simplicity of explanation, it is supposed that the delivery areas of a plurality of consignors do not overlap. In addition, it is supposed that the delivery areas of the plurality of consignors are adjacent to each other, and the delivery end position and the delivery start position of each pair of adjacent delivery areas match. In addition, it is supposed that the delivery area information is generated at a delivery planning apparatus (not depicted) that performs delivery planning for delivery goods, and is stored on the storage section 12. In this case, the delivery planning apparatus generates the delivery area information in response to acceptance of delivery requests for delivery goods from consignors. Note that whereas it is supposed that the storage section 12 stores the delivery area information, this is not the sole example. The delivery planning apparatus may store the delivery area information, and the information processing apparatus 1 may refer to the delivery area information. In addition, whereas it is supposed that the delivery area information includes the delivery start positions and the delivery end positions representing the delivery areas corresponding to the delivery goods, this is not the sole example. Instead of the delivery start positions and the delivery end positions or in addition to the delivery start positions and the delivery end positions, the delivery area information may include delivery start times and delivery end times.

The control section 13 functions as the accepting section 131, the calculating section 132, the generating section 133, the transmitting section 134, and the billing section 135. It is supposed that, for example, the control section 13 is a processor such as a CPU (Central Processing Unit). The control section 13 realizes the functions of the respective functional sections mentioned above by executing the program stored on the storage section 12. Note that the control section 13 may include one or more processors, and furthermore may include a combination including one or more electronic circuits.

The accepting section 131 accepts a carbon-dioxide emission-amount reduction request related to the delivery of one or more delivery goods requested by a particular consignor in a plurality of consignors. For example, from a terminal 3 used by the particular consignor, the accepting section 131 accepts a carbon-dioxide emission-amount reduction request including a consignor ID of the consignor and a delivery date. Here, in a case where the delivery planning apparatus accepts a delivery request from a particular consignor, the delivery planning apparatus may accept the carbon-dioxide emission-amount reduction request. Then, the accepting section 131 may accept the carbon-dioxide emission-amount reduction request accepted by the delivery planning apparatus by acquiring, from the delivery planning apparatus, the carbon-dioxide emission-amount reduction request.

It is supposed that delivery based on carbon-dioxide emission-amount reduction requests is a fee-based service, and consignors are billed by the generating section 133 mentioned later for prices according to reduction requests. For example, in response to generation of driving plan information for a transport vehicle 2 corresponding to reduction requests or in response to driving of a transport vehicle 2 based on driving plan information, consignors are billed by the billing section 135 for prices according to the reduction requests. In addition, for example, a carbon-dioxide emission-amount reduction request is a request for reducing a carbon dioxide emission amount by causing a transport vehicle 2 to drive, by using a motor, in an entire target delivery area which is a delivery area corresponding to a particular consignor who made the reduction request. In the following explanation, carbon-dioxide emission-amount reduction requests are also referred to as reduction requests simply.

Note that reduction requests are not necessarily requests for reducing carbon dioxide emission amounts by causing a transport vehicle 2 to drive in entire target delivery areas by using a motor. For example, consignors may be allowed to designate carbon-dioxide emission-amount reduction amounts. In this case, reduction requests include reduction amount information representing the carbon-dioxide emission-amount reduction amounts. In addition, consignors may be allowed to designate consumption amounts of electrical energy consumed by causing a transport vehicle 2 to drive by using a motor, for reducing carbon dioxide emission amounts. In this case, reduction requests include energy consumption amount information representing consumption amounts of electrical energy consumed by causing the transport vehicle 2 to drive by using the motor.

In response to acceptance of a reduction request by the accepting section 131, the calculating section 132 refers to the storage section 12, and identifies a target delivery area which is a delivery area of a consignor who made the reduction request in a single course of driving. For example, the calculating section 132 refers to delivery area information stored on the storage section 12, and identifies a delivery start position and a delivery end position associated with a delivery date and a consignor ID included in the reduction request accepted by the accepting section 131. The calculating section 132 identifies the target delivery area by identifying a driving route of the transport vehicle 2 from the identified delivery start position to the identified delivery end position.

The calculating section 132 calculates a charge-amount reduction amount of the electric power storage apparatus in a case where the transport vehicle 2 drives in at least a partial area of the target delivery area by using the motor such that a carbon-dioxide emission-amount reduction amount corresponding to the reduction request is satisfied. In a case where the reduction request is a request for reducing a carbon dioxide emission amount by causing the transport vehicle 2 to drive in the entire target delivery area by using the motor, the calculating section 132 calculates a charge-amount reduction amount of the electric power storage apparatus in a case where the transport vehicle 2 drives in the entire target delivery area by using the motor.

For example, the storage section 12 has stored thereon a reduction amount at the time of motor driving which is a reduction amount per unit distance of the charge amount of the electric power storage apparatus due to electric power consumption by the motor in a case where the transport vehicle 2 drives by using the motor. On the basis of a driving route in the target delivery area, the calculating section 132 calculates a driven distance of the target delivery area of the transport vehicle 2. The calculating section 132 calculates a charge-amount reduction amount in a case where the transport vehicle 2 drives in the entire target delivery area by using the motor by multiplying the calculated driven distance and the reduction amount at the time of motor driving.

In addition, in a case where the reduction request includes reduction amount information representing a carbon-dioxide emission-amount reduction amount, the calculating section 132 calculates a charge-amount reduction amount of the electric power storage apparatus in a case where the transport vehicle 2 drives in at least a partial area of the target delivery area by using the motor such that the reduction amount represented by the reduction amount information included in the reduction request is satisfied.

For example, the storage section 12 has stored thereon a carbon dioxide reduction amount per unit distance that is obtained by subtracting a carbon dioxide emission amount in a case where the transport vehicle 2 drives the unit distance by using the motor from a carbon dioxide emission amount in a case where the transport vehicle 2 drives the unit distance by using the engine. By dividing the carbon-dioxide emission-amount reduction amount represented by the reduction request by the carbon dioxide reduction amount per unit distance, the calculating section 132 calculates a distance that the transport vehicle 2 needs to drive by using the motor in order for a carbon-dioxide emission-amount reduction amount attained by causing the transport vehicle 2 to drive by using the motor to reach the carbon-dioxide emission-amount reduction amount represented by the reduction request. By multiplying the reduction amount at the time of motor driving and the calculated driven distance, the calculating section 132 calculates a charge-amount reduction amount in a case where the transport vehicle 2 drives in at least a partial area of the target delivery area by using the motor such that the carbon-dioxide emission-amount reduction amount corresponding to the reduction request is satisfied.

In addition, in a case where the reduction request includes energy consumption amount information representing a consumption amount of electrical energy consumed by causing the transport vehicle 2 to drive by using the motor, the calculating section 132 treats the energy consumption amount as a charge-amount reduction amount of the electric power storage apparatus. Note that in a case where the reduction request includes the energy consumption amount information, the calculating section 132 may calculate a distance that can be driven by using the motor with the electrical energy consumption amount represented by the energy consumption amount information on the basis of the electrical energy consumption amount and the reduction amount at the time of motor driving. Then, the calculating section 132 may calculate a carbon dioxide reduction amount corresponding to the reduction request on the basis of the distance that can be driven by using the motor and the carbon dioxide reduction amount per unit distance, and notify the carbon dioxide reduction amount corresponding to the reduction request to the terminal 3. By doing so, the information processing apparatus 1 can allow the consignor who made the reduction request to grasp the carbon dioxide reduction amount corresponding to the reduction request.

After the calculating section 132 calculates the charge-amount reduction amount, on the basis of the charge-amount reduction amount, the generating section 133 generates driving plan information for the transport vehicle 2 that delivers delivery goods of the consignor who made the reduction request. The generating section 133 sets a use amount of the motor in a delivery area before the target delivery area such that the charge amount of the electric power storage apparatus at the start of the target delivery area exceeds the charge-amount reduction amount calculated by the calculating section 132, and generates the driving plan information for the transport vehicle 2 in each delivery area.

For example, the storage section 12 has stored thereon reduction amounts at the time of engine driving which are reduction amounts per unit time of the charge amount of the electric power storage apparatus due to electric power consumption of electric auxiliary equipment or the like in a case where the transport vehicle 2 drives by using the engine. Specifically, the storage section 12 has stored thereon, as reduction amounts at the time of engine driving, a reduction amount at the time of assisted driving in a case where the transport vehicle 2 drives with drive-force support (assist) from the motor, and a reduction amount at the time of unassisted driving in a case where the transport vehicle 2 drives without drive-force support from the motor. In addition, as mentioned above, the storage section 12 has stored thereon the reduction amount at the time of motor driving. In addition, it is supposed that the charging apparatus of the transport vehicle 2 is fully charged at the start of delivery. In the following explanation, driving with drive-force support from a motor at the time of engine driving is called assisted driving, and driving without drive-force support from a motor at the time of engine driving is called unassisted driving.

For example, the generating section 133 calculates a charge-amount reduction amount of the electric power storage apparatus in a case where the transport vehicle 2 performs assisted driving in each of a delivery area before the target delivery area and a delivery area after the target delivery area, and a reduction amount of the electric power storage amount in a case where the transport vehicle 2 performs unassisted driving. The generating section 133 decides a driving state in the delivery area before the target delivery area and a driving state in the delivery area after the target delivery area such that the total of the charge-amount reduction amounts of the electric power storage apparatus calculated for the delivery area before the target delivery area and the delivery area after the target delivery area, and the charge-amount reduction amount calculated by the calculating section 132 becomes equal to or smaller than the charge amount of the charging apparatus in the fully charged state. For example, the generating section 133 generates driving plan information specifying that the transport vehicle 2 drives in the target delivery area by using the motor, and performs assisted driving or unassisted driving in the delivery area before the target delivery area and the delivery area after the target delivery area.

Figure 4:
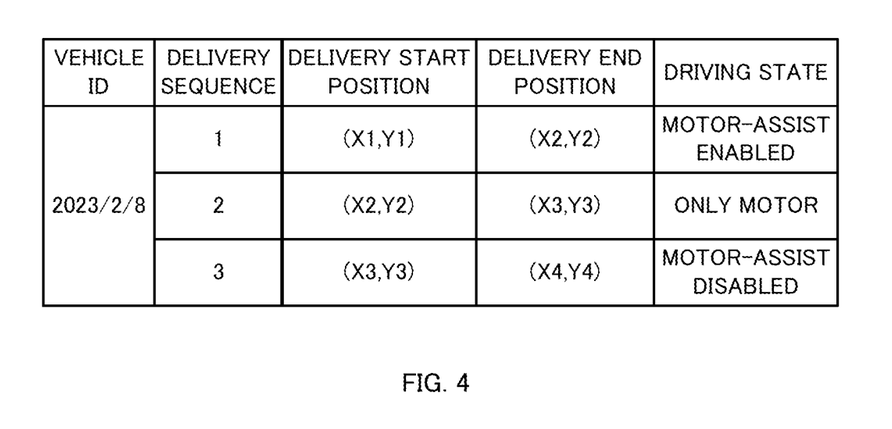
FIG. 4 is a figure depicting an example of driving plan information.

For example, the generating section 133 generates driving plan information including delivery dates, a position of each of a plurality of delivery areas in delivery sequence, delivery start positions and delivery end positions, driving means information representing use amounts of the motor in the delivery areas. FIG. 4 is a figure depicting an example of the driving plan information. As depicted in FIG. 4, it can be seen that delivery dates, a position of each of a plurality of delivery areas in delivery sequence, delivery start positions and delivery end positions, and driving states are associated with each other in the driving plan information. For example, the driving states are "motor-assist enabled" representing assisted driving, "motor-assist disabled" representing unassisted driving, and "only motor."

Here, in a case where the total of the charge-amount reduction amounts of the electric power storage apparatus at the time of unassisted driving calculated for the delivery area before the target delivery area and the delivery area after the target delivery area, and the charge-amount reduction amount calculated by the calculating section 132 is greater than the charge amount of the charging apparatus in the fully charged state, this means that the transport vehicle 2 cannot drive satisfying the reduction request accepted by the accepting section 131. Because of this, before accepting the reduction request, the accepting section 131 may temporarily accept the reduction request from the consignor, and accept the reduction request under a condition that the generating section 133 can generate driving plan information satisfying a carbon-dioxide emission-amount reduction amount corresponding to the reduction request.

In this case, when the accepting section 131 temporarily accepts the reduction request, the calculating section 132 calculates a charge-amount reduction amount of the electric power storage apparatus in a case where the transport vehicle 2 drives in at least a partial area of the target delivery area by using the motor such that the carbon-dioxide emission-amount reduction amount corresponding to the reduction request is satisfied.

The generating section 133 calculates a charge-amount reduction amount of the electric power storage apparatus in a case where unassisted driving is performed in each of the delivery area before the target delivery area and the delivery area after the target delivery area. The generating section 133 determines whether or not it is possible to generate driving plan information satisfying the reduction request by determining whether or not the total of the charge-amount reduction amounts of the electric power storage apparatus calculated for the delivery area before the target delivery area and the delivery area after the target delivery area, and the charge-amount reduction amount calculated by the calculating section 132 is greater than the charge amount of the charging apparatus in the fully charged state.

If the generating section 133 determines that it is possible to generate driving plan information satisfying the reduction request, the accepting section 131 formally accepts the temporarily accepted reduction request. If the generating section 133 determines that it is not possible to generate driving plan information satisfying the reduction request, the accepting section 131 transmits, to a terminal 3 of the consignor, error information representing that the temporarily accepted reduction request is not accepted. By doing so, the information processing apparatus 1 can prevent a reduction request from being accepted undesirably in a case where it is not possible to generate driving plan information satisfying the reduction request.

Note that the accepting section 131 temporarily accepts reduction requests from a plurality of consignors who requested the delivery of each of a plurality of delivery goods that a transport vehicle 2 delivers in a single course of driving, in some cases. In this case, the generating section 133 may determine whether or not it is possible to generate driving plan information satisfying the reduction requests in sequence in which the reduction requests are made. For example, it is supposed that, after it is determined that driving plan information satisfying a reduction request of the first consignor who made a reduction request first can be generated, the accepting section 131 temporarily accepts a reduction request from the second consignor. In this case, the calculating section 132 calculates a charge-amount reduction amount of the electric power storage apparatus in a case where the transport vehicle 2 drives in at least a partial area of a target delivery area of the second consignor by using the motor such that a carbon-dioxide emission-amount reduction amount corresponding to the reduction request of the second consignor is satisfied.

The generating section 133 calculates a charge-amount reduction amount of the electric power storage apparatus in a case where unassisted driving is performed in a delivery area different from the target delivery areas of the first consignor and the second consignor. The generating section 133 determines whether or not it is possible to generate driving plan information satisfying the reduction request of the second consignor by determining whether or not the total of the charge-amount reduction amount of the electric power storage apparatus corresponding to the target delivery area of the first consignor, the charge-amount reduction amount of the electric power storage apparatus corresponding to the target delivery area of the second consignor, and the charge-amount reduction amount of the electric power storage apparatus calculated for the delivery area different from those target delivery areas is greater than the charge amount of the charging apparatus in the fully charged state.

If the generating section 133 determines that it is possible to generate driving plan information satisfying the reduction request of the second consignor, the accepting section 131 formally accepts the temporarily accepted reduction request of the second consignor. If the generating section 133 determines that it is not possible to generate driving plan information satisfying the reduction request of the second consignor, the accepting section 131 transmits, to a terminal 3 of the second consignor, error information representing that the temporarily accepted reduction request of the second consignor is not accepted.

In addition, if the generating section 133 generates driving plan information specifying that the transport vehicle 2 drives in a target delivery area by using the motor, and performs assisted driving or unassisted driving in a delivery area different from the target delivery area, there is an extra electric power storage amount of the electric power storage apparatus at the end of driving of the transport vehicle 2 in a single course of driving undesirably, and an opportunity for reduction of a carbon dioxide emission amount is lost.

Because of this, the generating section 133 may generate driving plan information specifying that the transport vehicle 2 drives in at least a part of the delivery area before the target delivery area by using the motor such that the charge amount of the electric power storage apparatus at the start of the target delivery area exceeds the reduction amount calculated by the calculating section 132.

For example, the storage section 12 has stored thereon reduction amounts at the time of engine driving which are reduction amounts per unit time of the charge amount of the electric power storage apparatus due to electric power consumption of electric auxiliary equipment or the like in a case where the transport vehicle 2 drives by using the engine. In addition, as mentioned above, the storage section 12 has stored thereon the reduction amount at the time of motor driving. In addition, it is supposed that the charging apparatus of the transport vehicle 2 is fully charged at the start of delivery.

First, the generating section 133 calculates, as a preceding-area tolerated value, the maximum charge-amount value by which the charge amount of the electric power storage apparatus can be reduced in a delivery area before the target delivery area by subtracting the reduction amount calculated by the calculating section 132 from the charge amount of the electric power storage apparatus in the fully charged state. For example, the generating section 133 calculates a charge-amount reduction amount in a case where the transport vehicle 2 drives in the delivery area before the target delivery area by using the motor. Then, the generating section 133 generates driving plan information specifying that the transport vehicle 2 drives in the delivery area before the target delivery area by using the motor in a case where the reduction amount is equal to or smaller than the preceding-area tolerated value.

In addition, in a case where the reduction amount exceeds the preceding-area tolerated value, the generating section 133 generates driving plan information specifying that the transport vehicle 2 drives in a partial area of the delivery area before the target delivery area by using the engine, and the transport vehicle 2 drives in the remaining area by using the motor. For example, in a case where the distance of the delivery area before the target delivery area is $D_1$, a distance which the transport vehicle 2 drives in the delivery area before the target delivery area by using the engine is $A_1$, the reduction amount at the time of engine driving is $a_1$, the reduction amount at the time of motor driving is $b_1$, and the preceding-area tolerated value is $X_1$, the distance $A_1$ is calculated such that the following Formula (1) holds true. Here, the reduction amount at the time of engine driving is a reduction amount at the time of assisted driving or a reduction amount at the time of unassisted driving.

$$A_1 \times a_1 + (D_1 - A_1) \times b_1 \leq X_1 \quad (1)$$

In addition, the generating section 133 may generate driving plan information specifying that the transport vehicle 2 drives in at least a part of a delivery area after the target delivery area by using the motor in a case where the charge amount of the electric power storage apparatus after the end of the target delivery area exceeds the minimum value that the charge amount of the electric power storage apparatus can assume at the start of the delivery area after the target delivery area. For example, the generating section 133 determines whether or not the charge amount of the electric power storage apparatus exceeds the minimum value that the charge amount of the electric power storage apparatus can assume after performing driving planning for the delivery area before the target delivery area and the target delivery area. Here, the minimum value that the charge amount of the electric power storage apparatus can assume is a charge-amount reduction amount in a case where the transport vehicle 2 performs unassisted driving in the entire delivery area after the target delivery area.

If it is determined that a post-target-area-driving charge amount which is the charge amount of the electric power storage apparatus after driving planning for the delivery area before the target delivery area and the target delivery area is performed exceeds the minimum value that the charge amount of the electric power storage apparatus can assume, the generating section 133 calculates a charge-amount reduction amount in a case where the transport vehicle 2 drives in the entire delivery area after the target delivery area by using the motor. Then, the generating section 133 generates driving plan information specifying that the transport vehicle 2 drives in the delivery area after the target delivery area by using the motor in a case where the reduction amount is equal to or smaller than the post-target-area-driving charge amount.

In addition, in a case where the reduction amount exceeds the post-target-area-driving charge amount, the generating section 133 generates driving plan information specifying that the transport vehicle 2 drives in a partial area of the delivery area after the target delivery area by using the engine, and the transport vehicle 2 drives in the remaining area by using the motor. For example, in a case where the distance of the delivery area after the target delivery area is $D_2$, a distance which the transport vehicle 2 drives in the delivery area after the target delivery area by using the engine is $A_2$, the reduction amount at the time of engine driving is $a_2$, the reduction amount at the time of motor driving is $b_2$, and the post-target-area-driving charge amount is $X_2$, the distance $A_2$ is calculated such that the following Formula (2) holds true.

$$A_2 \times a_2 + (D_2 - A_2) \times b_2 \leq X_2 \quad (2)$$

Note that whereas the generating section 133 calculates the distances that the transport vehicle 2 drives by using only the motor in the delivery area before the target delivery area and the delivery area after the target delivery area, and generates driving plan information specifying that the transport vehicle 2 drives the distances by using only the motor, this is not the sole example. The generating section 133 may generate driving plan information in which the use amount of the motor of the transport vehicle 2 in the delivery area before the target delivery area is set to a use amount equal to or smaller than the preceding-area tolerated value, and the motor is permitted to be used as appropriate only to the extent that the actual use amount does not exceed the use amount. Similarly, the generating section 133 may generate driving plan information in which the use amount of the motor in the delivery area after the target delivery area is set to a use amount equal to or smaller than the post-target-area-driving charge amount, and the motor is permitted to be used as appropriate only to the extent that the actual use amount does not exceed the use amount.

By doing so, the information processing apparatus 1 can cause the transport vehicle 2 to drive in at least a part of a delivery area different from the target delivery area by using the motor while meeting a carbon-dioxide emission-amount reduction request of a consignor in the target delivery area, thereby making it possible to contribute to reduction of the carbon dioxide emission amount.

The transmitting section 134 transmits driving plan information generated by the generating section 133 to a transport vehicle 2. For example, the storage section 12 has stored thereon an address of each of a plurality of transport vehicles 2 on communication networks. The transmitting section 134 identifies the address of a transport vehicle 2 transporting delivery goods of a consignor who made a reduction request, and transmits driving plan information to the identified address.

In response to generation of driving plan information by the generating section 133 corresponding to a reduction request, and transmission of the driving plan information by the transmitting section 134 to a transport vehicle 2, the billing section 135 bills a consignor who made the reduction request for a price according to reduction of a carbon dioxide emission amount. For example, the price to be calculated by the billing section 135 increases as a carbon-dioxide emission-amount reduction amount increases. Then, the billing section 135 transmits billing information for billing of the calculated price to a terminal 3 of the consignor who made the reduction request. Note that whereas the billing section 135 calculates the price on the basis of the carbon-dioxide emission-amount reduction amount, this is not the sole example. The billing section 135 may calculate the price on the basis of an amount of electrical energy (charge-amount reduction amount) consumed by the motor for reducing the carbon dioxide emission amount.

[Configuration of Driving Control Apparatus 20]

Figure 5:
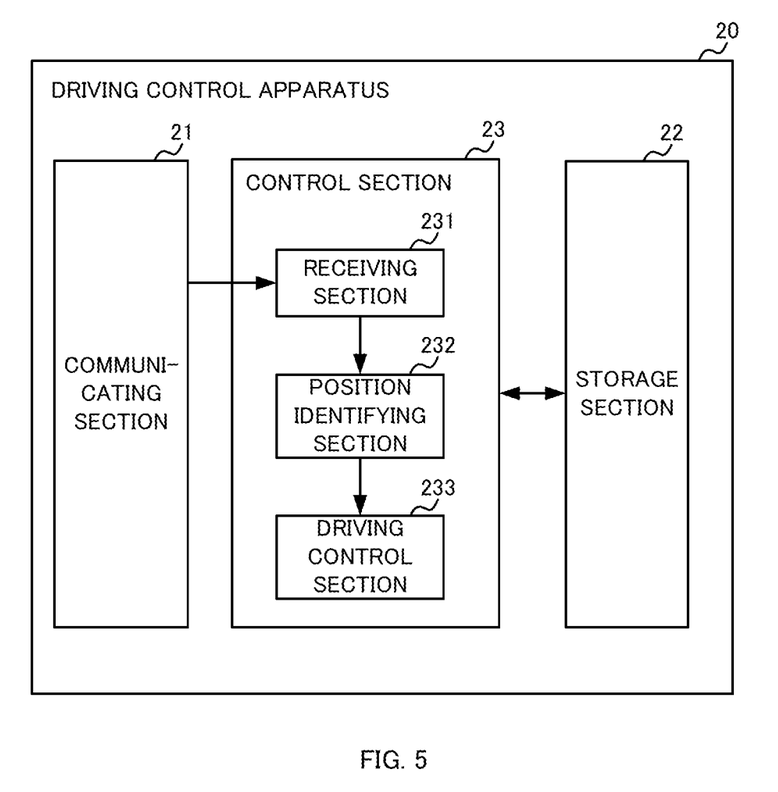
FIG. 5 is a figure depicting the functional configuration of a driving control apparatus.

Next, the configuration of the driving control apparatus 20 of each transport vehicle 2 is explained. FIG. 5 is a figure depicting the functional configuration of a driving control apparatus 20. As depicted in FIG. 5, the driving control apparatus 20 has a communicating section 21, a storage section 22, and a control section 23.

The communicating section 21 is a communication interface for transmitting and receiving data to and from the information processing apparatus 1 via a wireless communication line such as an Internet line or a wireless LAN line.

For example, the storage section 22 is a RAM or a ROM. The storage section 22 stores a program that causes the control section 23 to function as a receiving section 231, a position identifying section 232, and a driving control section 233.

For example, the control section 23 is a processor such as a CPU. By executing the program stored on the storage section 22, the control section 23 functions as the receiving section 231, the position identifying section 232, and the driving control section 233. Note that the control section 23 may include one or more processors, and furthermore may include a combination including one or more electronic circuits.

The receiving section 231 receives driving plan information from the information processing apparatus 1 via the communicating section 21. The receiving section 231 causes the storage section 12 to store the received driving plan information. In addition, in a case where driving plan information with the same delivery date as the received driving plan information is stored on the storage section 12, the receiving section 231 updates the driving plan information stored on the storage section 12 with the received driving plan information.

The position identifying section 232 identifies the position of the transport vehicle 2. For example, the position identifying section 232 identifies the position of the transport vehicle 2 on the basis of radio wave signals received from a GPS satellite (not depicted).

The driving control section 233 controls the engine and the motor, and controls driving of the transport vehicle 2 on the basis of the driving plan information received by the receiving section 231. For example, the driving control section 233 identifies positions in delivery sequence, delivery start positions, and delivery end positions included in the driving plan information received by the receiving section 231 and stored on the storage section 12. If the position of the transport vehicle 2 identified by the position identifying section 232 matches the delivery start position of a delivery area whose position in the delivery sequence is the first position, the driving control section 233 causes the transport vehicle 2 to drive by a means for driving corresponding to the delivery area. If the position of the transport vehicle 2 identified by the position identifying section 232 matches the delivery end position of the current delivery area, that is, the delivery start position of the next delivery area, the driving control section 233 causes the transport vehicle 2 to drive by a means for driving corresponding to the next delivery area. Thereby, the transport vehicle 2 can drive by means for driving corresponding to respective delivery areas.

Note that the driving control section 233 may not directly control the engine and the motor, but control driving of the transport vehicle 2 by causing a display panel to display information representing areas where the transport vehicle 2 drives by using the engine and areas where the transport vehicle 2 drives by using the motor such that a driver of the transport vehicle 2 can switch driving by using the engine and driving by using the motor on the basis of the driving plan information.

[Operation Sequence]

Figure 6:
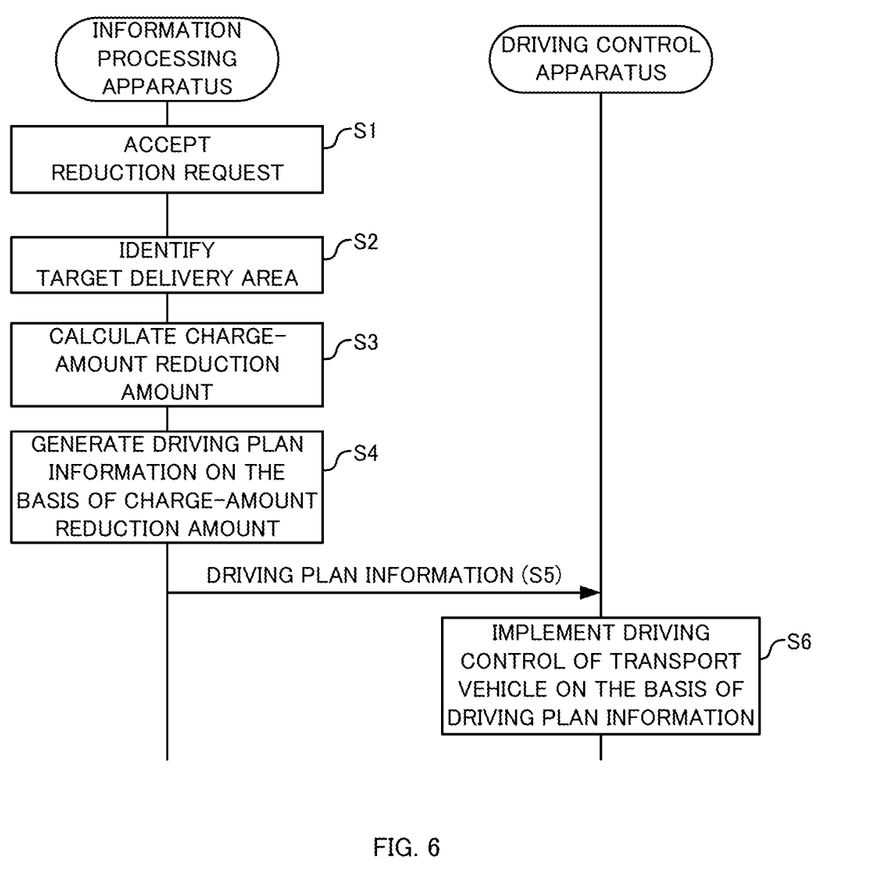
FIG. 6 is a sequence diagram depicting a processing procedure in the driving control system.

Next, a processing procedure in the driving control system S is explained. FIG. 6 is a sequence diagram depicting the processing procedure in the driving control system S. Note that it is supposed that, at the start of the sequence, delivery area information is stored on the storage section 12 of the information processing apparatus 1.

First, the accepting section 131 accepts a carbon-dioxide emission-amount reduction request related to the delivery of one or more delivery goods requested by a particular consignor in a plurality of consignors who requested the delivery of a plurality of delivery goods to be delivered by a transport vehicle 2 in a single course of driving (S1).

Next, the calculating section 132 identifies a target delivery area which is a delivery area of the consignor who made the reduction request (S2). Then, the calculating section 132 calculates a charge-amount reduction amount of the electric power storage apparatus in a case where the transport vehicle 2 drives in at least a partial area of the target delivery area by using the motor such that a carbon-dioxide emission-amount reduction amount corresponding to the reduction request is satisfied (S3).

Next, the generating section 133 generates driving plan information on the basis of the calculated charge-amount reduction amount (S4). The transmitting section 134 transmits the generated driving plan information to the driving control apparatus 20 of the transport vehicle 2 (S5). The receiving section 231 of the driving control apparatus 20 receives the driving plan information from the information processing apparatus 1.

The driving control section 233 of the driving control apparatus 20 implements driving control of the transport vehicle 2 by controlling the engine and the motor of the transport vehicle on the basis of the received driving plan information (S6).

Modification Example

Whereas it is supposed in the explanation mentioned above that delivery areas corresponding to a plurality of consignors do not overlap, parts of delivery areas may overlap. For example, in a case where delivery goods of each of a plurality of consignors are loaded onto transport vehicles 2 at a distribution center where delivery goods are gathered, and the delivery goods are delivered from there, the delivery goods of the plurality of consignors are mixedly present. In a case where delivery goods of a plurality of consignors are mixedly present, the calculating section 132 calculates carbon-dioxide emission-amount reduction amounts in a case where a transport vehicle 2 drives unit distances by using the motor on the basis of the weight ratio among the delivery goods of the plurality of consignors.

In this case, the carbon-dioxide emission-amount reduction amounts in the case where the transport vehicle 2 drives the unit distances by using the motor decrease. In contrast to this, in a case where a carbon-dioxide emission-amount reduction request includes reduction amount information representing a carbon-dioxide emission-amount reduction amount, the calculating section 132 may take into consideration an overlap between delivery areas to calculate a charge-amount reduction amount in a case where a transport vehicle 2 drives in at least a partial area of a target delivery area by using the motor.

For example, the storage section 12 has stored thereon a carbon dioxide reduction amount per unit distance that is obtained by subtracting a carbon dioxide emission amount in a case where the transport vehicle 2 drives the unit distance by using the motor from a carbon dioxide emission amount in a case where the transport vehicle 2 drives the unit distance by using the engine.

The calculating section 132 calculates, as a reduction amount at the time when delivery areas overlap, a carbon dioxide reduction amount per unit distance corresponding to a consignor who made a reduction request, on the basis of the weight ratio between delivery goods of the consignor who made the reduction request and delivery goods of a second consignor in an overlapping area which is a delivery area where a target delivery area of the consignor who made the reduction request and a delivery area of the second consignor overlap. In addition, the calculating section 132 calculates, as a reduction amount at the time when the delivery areas do not overlap, a carbon dioxide reduction amount per unit distance in an unoverlapping area which is a delivery area where the target delivery area of the consignor who made the reduction request and the delivery area of the second consignor do not overlap.

The calculating section 132 first calculates a driven distance of each of the unoverlapping area and the overlapping area such that the total of a result obtained by multiplying a distance that the transport vehicle 2 drives by using the motor in the unoverlapping area by the reduction amount at the time when the delivery areas do not overlap, and a result obtained by multiplying a distance that the transport vehicle 2 drives by using the motor in the overlapping area by the reduction amount at the time when the delivery areas overlap becomes the carbon-dioxide emission-amount reduction amount represented by the reduction request. Then, by multiplying the reduction amount at the time of motor driving and the calculated driven distances, the calculating section 132 calculates a charge-amount reduction amount in a case where the transport vehicle 2 drives in at least a partial area of the target delivery area by using the motor such that the carbon-dioxide emission-amount reduction amount corresponding to the reduction request is satisfied.

In addition, in a case where at least a part of the target delivery area overlaps the delivery area of the second consignor, a carbon-dioxide emission-amount reduction amount corresponding to the consignor who made the reduction request decreases as compared to a case where the target delivery area does not overlap the delivery area of the second consignor. Because of this, in a case where at least a part of the target delivery area which is the delivery area of the consignor overlaps the delivery area of the second consignor, the billing section 135 may take into consideration a carbon-dioxide emission-amount reduction amount in an overlapping delivery period to calculate an amount billed.

In this case, the billing section 135 may calculate a carbon dioxide reduction amount in the overlapping area where the target delivery area which is the delivery area of the consignor who made the reduction request and the delivery area of the second consignor overlap on the basis of the weight ratio between respective delivery goods of a plurality of the consignors, and also calculate a carbon dioxide reduction amount in an unoverlapping area where the delivery area of the consignor does not overlap the delivery area of the second consignor. Then, the billing section 135 may calculate an amount billed on the basis of the total amount of those carbon dioxide reduction amounts.

[Effects Attained by Information Processing Apparatus 1]

As explained above, in response to acceptance of a carbon-dioxide emission-amount reduction request related to the delivery of one or more delivery goods requested by a particular consignor in a plurality of consignors, the information processing apparatus 1 according to the embodiment calculates a charge-amount reduction amount of the electric power storage apparatus in a case where a transport vehicle 2 drives by using the motor such that a carbon-dioxide emission-amount reduction amount corresponding to the reduction request is satisfied in a target delivery area which is a delivery area of the particular consignor. Then, the information processing apparatus 1 sets a use amount of the motor in a delivery area before the target delivery area such that the charge amount of the electric power storage apparatus at the start of the target delivery area exceeds the calculated reduction amount, generates driving plan information for the transport vehicle 2 in each delivery area, and transmits the driving plan information to the transport vehicle 2. By doing so, the information processing apparatus 1 can meet the carbon-dioxide emission-amount reduction request related to the delivery of delivery goods from the consignor.

The invention claimed is:

1. An information processing apparatus that generates a driving plan for a transport vehicle that is driven by using an engine and a motor that is driven with electric power from an electric power storage apparatus, the information processing apparatus comprising:
   a Random Access Memory (RAM) or a Read Only Memory (ROM) that stores delivery area information representing a delivery area of one or more delivery goods requested by each of a plurality of consignors; and
   a processor coupled to the RAM or the RAM, the processor being configured to function as:
      an accepting section that accepts a carbon-dioxide emission-amount reduction request related to delivery of one or more delivery goods requested by a particular consignor in the plurality of consignors;
      a calculating section that calculates a charge-amount reduction amount of the electric power storage apparatus in a case where the transport vehicle drives by using the motor such that a carbon-dioxide emission-amount reduction amount corresponding to the reduction request is satisfied in a target delivery area which is a delivery area of the particular consignor on a basis of the delivery area information;
a generating section that sets a use amount of the motor in a delivery area before the target delivery area such that a charge amount of the electric power storage apparatus at a start of the target delivery area exceeds the reduction amount calculated by the calculating section, and generates driving plan information for the transport vehicle in each delivery area; and
a transmitting section that transmits the driving plan information to the transport vehicle,
wherein, before accepting the reduction request, the accepting section temporarily accepts the reduction request, and accepts the reduction request under a condition that the generating section is configured to generate driving plan information satisfying the carbon-dioxide emission-amount reduction amount corresponding to the reduction request, and
wherein, in response to a receiving section of the transport vehicle receiving the driving plan information from the information processing apparatus, a driving control section of the transport vehicle controls driving of the transport vehicle by directly controlling the engine and the motor on the basis of the received driving plan information.

2. The information processing apparatus according to claim 1, wherein
the reduction request is a request for reducing a carbon dioxide emission amount by causing the transport vehicle to drive in an entire target delivery area by using the motor, and
the calculating section calculates a charge-amount reduction amount of the electric power storage apparatus in a case where the transport vehicle drives in the entire target delivery area by using the motor.

3. The information processing apparatus according to claim 1, wherein
the accepting section accepts the reduction request including reduction amount information representing a carbon-dioxide emission-amount reduction amount related to the delivery of the one or more delivery goods requested by the particular consignor, and
the calculating section calculates a charge-amount reduction amount of the electric power storage apparatus in a case where the transport vehicle drives in at least a partial area of the target delivery area by using the motor such that the reduction amount represented by the reduction amount information included in the reduction request is satisfied.

4. The information processing apparatus according to claim 1, wherein
if the accepting section temporarily accepts the reduction request, the generating section calculates a second charge-amount reduction amount of the electric power storage apparatus in a case where the transport vehicle drives without using the motor in each of the delivery area before the target delivery area and a delivery area after the target delivery area, and determines whether or not it is possible to generate driving plan information satisfying the reduction request by determining whether or not a total of the second charge-amount reduction amount of the electric power storage apparatus calculated for each of the delivery area before the target delivery area and the delivery area after the target delivery area, and the second charge-amount reduction amount calculated by the calculating section is greater than a charge amount of the electric power storage apparatus in a fully charged state, and
the accepting section accepts the reduction request if the generating section determines that the driving plan information satisfying the reduction request can be generated.

5. The information processing apparatus according to claim 4, wherein the accepting section temporarily accepts the reduction requests from the plurality of consignors, and
the generating section determines whether or not it is possible to generate driving plan information satisfying the reduction request in sequence in which a plurality of the reduction requests are temporarily accepted.

6. The information processing apparatus according to claim 1, wherein the generating section generates driving plan information specifying that the transport vehicle drives in at least a part of the delivery area before the target delivery area by using the motor such that the charge amount of the electric power storage apparatus at the start of the target delivery area exceeds the reduction amount calculated by the calculating section.

7. The information processing apparatus according to claim 6, wherein
the generating section calculates, as a preceding-area tolerated value, a maximum charge-amount value by which the charge amount of the electric power storage apparatus can be reduced in the delivery area before the target delivery area by subtracting the reduction amount calculated by the calculating section from a charge amount of the electric power storage apparatus in a fully charged state, and also calculates, as a preceding-area reduction amount, a charge-amount reduction amount in a case where the transport vehicle drives in the delivery area before the target delivery area by using the motor, and
in a case where the calculated preceding-area reduction amount is equal to or smaller than the preceding-area tolerated value, the generating section generates driving plan information specifying that the transport vehicle drives in the delivery area before the target delivery area by using the motor.

8. The information processing apparatus according to claim 7, wherein, in a case where the preceding-area reduction amount exceeds the preceding-area tolerated value, the generating section generates driving plan information specifying that the transport vehicle drives in a partial area of the delivery area before the target delivery area by using the engine, and the transport vehicle drives in a remaining area of the delivery area before the target delivery area by using the motor.

9. The information processing apparatus according to claim 1, wherein, in a case where the charge amount of the electric power storage apparatus at an end of the target delivery area exceeds a minimum value that the charge amount of the electric power storage apparatus can assume, the generating section generates driving plan information specifying that the transport vehicle drives in at least a part of a delivery area after the target delivery area by using the motor.

10. The information processing apparatus according to claim 9, wherein the generating section performs driving planning for the delivery area before the target delivery area and the target delivery area, calculates a post-target-area-driving charge amount which is a charge amount of the electric power storage apparatus after performing the driving planning, and, in a case where the calculated post-target-area-driving charge amount exceeds the minimum value that the charge amount of the electric power storage apparatus can assume, generates driving plan information specifying that the transport vehicle drives in at least a part of the delivery area after the target delivery area by using the motor.

11. The information processing apparatus according to claim 10, wherein the generating section calculates a following-area reduction amount which is a charge-amount reduction amount in a case where the transport vehicle drives in an entire delivery area after the target delivery area by using the motor, and, in a case where the calculated following-area reduction amount is equal to or smaller than the post-target-area-driving charge amount, generates driving plan information specifying that the transport vehicle drives in the delivery area after the target delivery area by using the motor.

12. The information processing apparatus according to claim 11, wherein, in a case where the following-area reduction amount exceeds the post-target-area-driving charge amount, the generating section generates driving plan information specifying that the transport vehicle drives in a partial area of the delivery area after the target delivery area by using the engine, and the transport vehicle drives in a remaining area of the delivery area after the target delivery area by using the motor.

13. A computer-executed information processing method comprising:
  accepting a carbon-dioxide emission-amount reduction request related to delivery of one or more delivery goods requested by a particular consignor in a plurality of consignors who request delivery of each of a plurality of delivery goods to be delivered by a transport vehicle that is driven by using an engine and a motor that is driven with electric power from an electric power storage apparatus;
  referring to a Random Access Memory (RAM) or a Read Only Memory (ROM) that stores delivery area information representing a delivery area of one or more delivery goods requested by each of the plurality of consignors, and calculating a charge-amount reduction amount of the electric power storage apparatus in a case where the transport vehicle drives by using the motor such that a carbon-dioxide emission-amount reduction amount corresponding to the reduction request is satisfied in a target delivery area which is a delivery area of the particular consignor;
  setting a use amount of the motor in a delivery area before the target delivery area, and generating driving plan information for the transport vehicle in each delivery area such that a charge amount of the electric power storage apparatus at a start of the target delivery area exceeds the calculated reduction amount; and
  transmitting the generated driving plan information to the transport vehicle,
  wherein, before accepting the reduction request, the reduction request is temporarily accepted, and the reduction request is accepted under a condition that the generating driving plan information is configured to generate driving plan information satisfying the carbon-dioxide emission-amount reduction amount corresponding to the reduction request, and wherein, in response to a receiving section of the transport vehicle receiving the driving plan information from the information processing apparatus, a driving control section of the transport vehicle controls driving of the transport vehicle by directly controlling the engine and the motor on the basis of the received driving plan information.

14. A driving control system comprising:
  a transport vehicle that is driven by using an engine and a motor that is driven with electric power from an electric power storage apparatus; and
  an information processing apparatus that generates driving plan information for the transport vehicle,
  wherein the information processing apparatus has:
    a Random Access Memory (RAM) or a Read Only Memory (ROM) that stores delivery area information representing a delivery area of one or more delivery goods requested by each of a plurality of consignors; and
    a processor coupled to the RAM or the RAM, the processor being configured to function as:
      an accepting section that accepts a carbon-dioxide emission-amount reduction request related to delivery of one or more delivery goods requested by a particular consignor in the plurality of consignors;
      a calculating section that calculates a charge-amount reduction amount of the electric power storage apparatus in a case where the transport vehicle drives by using the motor such that a carbon-dioxide emission-amount reduction amount corresponding to the reduction request is satisfied in a target delivery area which is a delivery area of the particular consignor on a basis of the delivery area information;
      a generating section that sets a use amount of the motor in a delivery area before the target delivery area such that a charge amount of the electric power storage apparatus at a start of the target delivery area exceeds the reduction amount calculated by the calculating section, and generates driving plan information for the transport vehicle in each delivery area; and
      a transmitting section that transmits the driving plan information generated by the generating section to the transport vehicle, and the transport vehicle has:
    a receiving section that receives the driving plan information from the information processing apparatus; and
    a driving control section that controls driving of the transport vehicle by directly controlling the engine and the motor on a basis of the driving plan information received by the receiving section,
  wherein, before accepting the reduction request, the accepting section temporarily accepts the reduction request, and accepts the reduction request under a condition that the generating section is configured to generate driving plan information satisfying the carbon-dioxide emission-amount reduction amount corresponding to the reduction request.

15. The information processing apparatus according to claim 1, wherein, without intervention of a driver of the transport vehicle, the transport vehicle directly controls the engine and the motor based on the driving plan information.

* * * * *